United States Patent

[11] 3,623,520

[72] Inventor Peter J. Neild
 North Vancouver, B. C., Canada
[21] Appl. No. 858,707
[22] Filed Sept. 17, 1969
[45] Patented Nov. 30, 1971
[73] Assignee MacMillan Bloedel Limited
 Vancouver, British Columbia, Canada

[54] SAW GUIDE APPARATUS
 8 Claims, 5 Drawing Figs.
[52] U.S. Cl. .................................................. 143/164,
 143/160, 143/157 C, 83/169, 83/201.15
[51] Int. Cl. .................................................. B27b 11/02,
 B27b 13/10, B27b 13/12
[50] Field of Search .......................................... 143/164,
 160, 157; 83/169, 201.15

[56] References Cited
UNITED STATES PATENTS
3,225,801 12/1965 Dunn et al. ..................... 143/160
3,452,734 7/1969 Cleland et al. ................... 143/160 X
3,479,097 11/1969 McLauchlan .................. 383/201.15 X Primary Examiner—Donald R. Schran
Attorney—Fetherstonhaugh & Co.

ABSTRACT: There is disclosed saw guide apparatus for sawing machines and sawing machines incorporating this apparatus. The saw guide apparatus has guide arms to be positioned on opposite sides of a saw blade, and spaced slightly from the surfaces thereof. These arms have surfaces opposed to the blade faces, and there is provided means for directing a liquid through and outwardly from these surfaces so as to apply films of the liquid on to the faces of the blades.

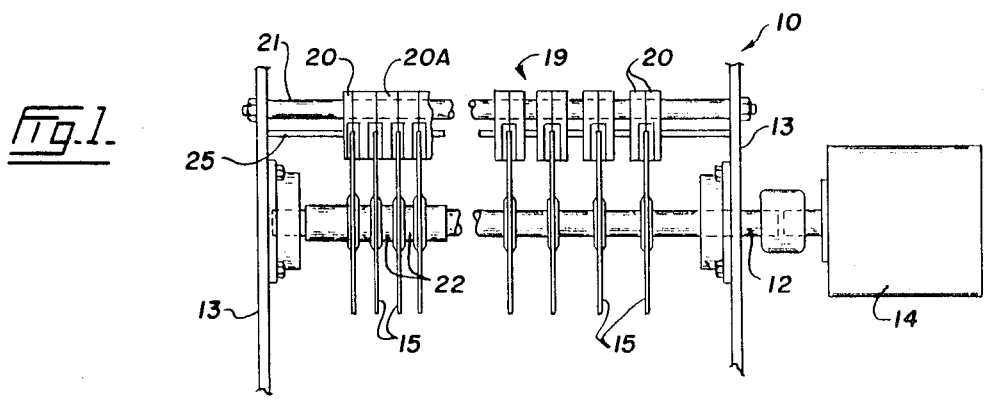
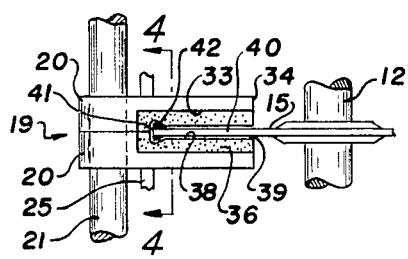
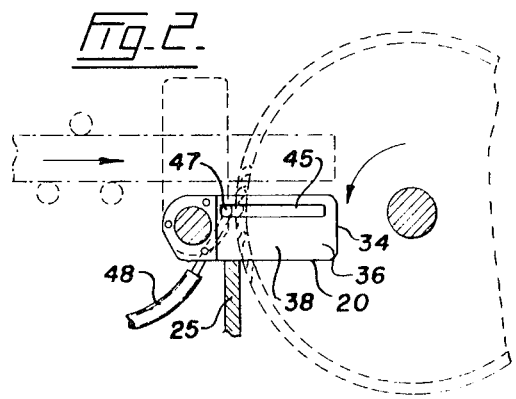
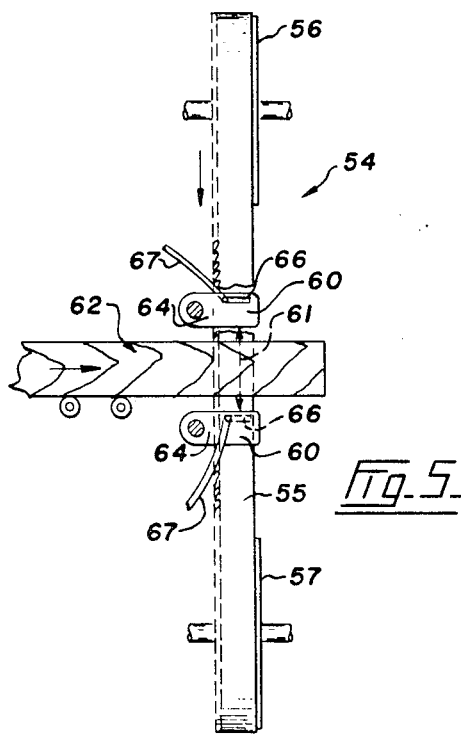
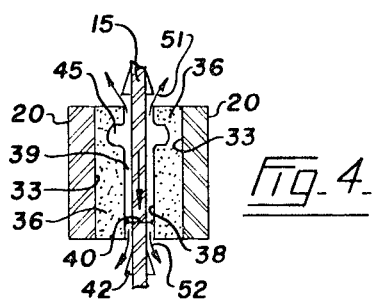
INVENTOR
PETER J. NEILD
BY
Featherstonhaugh & Co.
ATTORNEYS

SAW GUIDE APPARATUS

BACKGROUND OF THE INVENTION

This invention relates to guide apparatus for circular and band saw blades for stabilizing, cooling and lubricating said blades.

Some efforts have been made in the past to reduce the waste of wood in the lumber industry by using thinner saw blades which produce smaller saw kerfs. In order to use the thinner blades, it has been necessary to provide guides for the saw blades adjacent the areas thereof where the cutting takes place in an effort to stabilize the blades and to get reasonably straight cutting. Such a guide arrangement is illustrated and described in U.S. Pat. No. 3,285,302. In the past when the same kerf has been reduced the saving has usually been lost because the sawing accuracy has reduced as well. The use of such guides results in considerable friction and the necessity of directing large quantities of water on to the saw and saw cuts above the level of the wood. This requires a large quantity of water, a large percentage of which does not serve any useful purpose since it bounces off the saw and the wood and falls down below the sawing machine. The excess water mixes with the sawdust, and in many cases it is necessary to separate the water therefrom by dewatering screens and the like. In addition, it is not possible to use large quantities of water when dried wood is being cut. Another problem results from the fact that sawdust and dirt get between the guides and the saw blades thereby increasing wear and heat problems due to friction.

SUMMARY OF THE INVENTION

The present invention stabilizes, cools and lubricates each saw blade while reducing or eliminating the above-mentioned problems by applying a thin film of liquid, usually water, on to the blade so that is tends to remain thereon for a time after application. This keeps the water only where it is required, reduces the quantity of water needed, and eliminates the necessity of having to remove the water from the sawdust. The amount of water is so small that dried wood can be cut without being harmed by excess water. In addition, the apparatus of this invention is such that the pressure of the water can be adjusted to prevent small particles of sawdust or other particles from entering between the saw and the saw guide. This greatly reduces friction with its resulting problems, and the film lubricates and cools the blade. Thus, the apparatus stabilizes the blade without the problems of the prior art.

Saw guide apparatus in accordance with the present invention comprises a pair of guide arms to be positioned on opposite sides of a saw blade during operation thereof. These arms when in position have surfaces opposed to and normally slightly spaced from opposite faces of the blade. The apparatus includes means for directing a liquid through and outwardly from the arm surfaces so as to apply films of the liquid on the faces of the blade. This normally forms a liquid surface between the blade faces and the adjacent arm surfaces which cools and lubricates the blade. The pressure of the liquid can be adjusted so as to prevent particulate material from lodging between the blade and the arms.

The invention also contemplates a sawing machine incorporating these guide arms and the accompanying liquid directing means thereof.

BRIEF DESCRIPTION OF THE DRAWINGS

FIG. 1 is a plan view of a sawing machine incorporating this invention, and illustrating two different circular saw blade arrangements in the machine, FIG. 2 is an enlarged side elevation of a guide arm in accordance with this invention, FIG. 3 is a horizontal section through part of a circular saw blade, showing in plan a pair of guide arms associated therewith, FIG. 4 is an enlarged section taken on the line 4—4 of FIG. 3, and FIG. 5 is a side elevation of a band saw incorporating this invention.

DESCRIPTION OF THE PREFERRED EMBODIMENTS

Referring to the drawings, 10 is a sawing machine incorporating the present invention. This machine has a shaft or arbor 12 journaled in suitable bearings carried by a frame 13. This shaft is operatively connected to a suitable source of power, such as an electric motor 14. The shaft 12 carries one or more saw blades 15 within frame 13, each blade being keyed to the shaft to rotate therewith. Blades 15 is this example are circular saws, and they are usually relatively thin so as to cut only very narrow kerfs in the wood. If the sawing machine is a shifting saw edger, the saws are selectively moved along the shaft by suitable mechanism, not shown. Four of these saws are illustrated at the right-hand side of FIG. 1.

A guide unit 19 made up of a plurality of guide arms 20 is mounted in any convenient manner adjacent saws 15. In this example, each arm 20 is swingably mounted on a shaft 21 carried by frame 13 at opposite ends thereof. In a shifting saw edger guide arms are arranged in pairs, one pair constituting a guide unit for each saw blade 15, and each guide unit is shifted with its saw blade when the latter is moved along shaft 12.

The saw blades 15 shown at the left-hand side of sawing machine 10 are set up as in a gang edger and are not movable along shaft 12. In this case, the blades are spaced from each other and from frame 13 by collars 22 which are loosely fitted on shaft 12. Each guide arm 20a is associated with two blades 15. A guide arm 20 is provided for the outer surface of the outermost saw blade at left of the machine.

Arms 20 and/or arms 20a are swingably mounted on shaft 21 and extend substantially horizontally into spaces between saw blades 15. These arms are swingably mounted on the shaft so that they can be swung up into the dotted position shown in FIG. 2 when it is desired to replace a saw blade or to change the spacing of the blades on arbor 12. Suitable means is provided for retaining the guide arms in their normal operative position, such as a bar 25 extending parallel to shaft 21 beneath said arms, said bar being carried by frame 13. The guide arms rest on bar 25 when they are in operative position.

The arms 20 of each unit 19 bear against each other at shaft 21, see FIG. 3, but each arm is formed with a recess 33 at its free end 34, said recess extending inwardly from this end and from top to bottom of the arm, as seen in FIG. 4. Each recess 33 has a replaceable wear pad 36 therein formed of any suitable wear-resistant material such as babbitt, composition, wood or the like. Each pad 36 has an inner surface 38 which extends along but is normally spaced slightly from the adjacent surface of a saw blade 15. Each surface 38 is the effective inner surface of its arm 20, and is located as close as possible to the adjacent saw face, the intervening space 39 being something of the order of 0.005 inch. In other words, the opposed surfaces 38 of a pair of arms 20 form a space 40 therebetween through which saw blade 15 travels during operation, see FIG. 4. It will be noted that each pad 36 is formed with a substantially vertical groove 41 near its inner end and through which the teeth 42 of the saw blade travel. Grooves 41 are enlargements at the inner end of space 40 formed by the pair of guide arms in order to accommodate the teeth of the saw blade. Pads 36 are retained in recesses 33 of the guide arms in any desired manner.

Each arm 20 is provided with means for directing a liquid through surface 38 thereof on to the adjacent face of blade 15. One or more openings are formed in arm surface 38 for this purpose. In this example, a groove 45 is formed in surface 38 and extends substantially radially inwardly of the saw blade. This groove opens outwardly laterally towards the saw surface, and liquid, such as water, is directed into this groove in any convenient manner. In this example, a passage 47 is formed in each arm adjacent of the end thereof which is mounted on shaft 21, see FIG. 2, one end of this passage opening into groove 45, and the opposite end thereof being connected to a flexible hose 48 which extends to a source of water, not shown. It is preferable that the water directed to groove 45 be supplied thereto under pressure, something of the order of 25 to 70 p.s.i.

Guide arms 20a are the same as guide arms 20 excepting that each arm 20a has a recess 33 in each of opposite faces thereof with a wear pad 36 therein. Water is supplied to each of these pads in the manner described above.

During operation, each saw blade is supported or stabilized by the guide arms 20 and/or 20a on opposite sides thereof near the point where the blade cuts through the wood. It will be noted that the pads 36 of the guide arms extend from the rim of the blade inwardly towards the center of rotation thereof. These pads stabilize the thin blade as the latter cuts through the wood. While the cutting is taking place, water is directed into the grooves 45 of the two guide arms from whence it flows on to the adjacent faces of the saw blade. As the blade moves through space 40 between the arms, it tends to carry water out of the grooves 45 on opposite sides of the blade so that the water forms a thin film on the blade faces. As there is a tendency for some of this water to adhere to the faces, it tends to remain on the blade for at least a complete revolution thereof. As a result, the faces of the blade have films of water thereon adjacent the cutting teeth throughout the length of the blade edge. This water cools the blade, and acts as a lubricant between the guide arm surfaces 38 and the adjacent blade faces.

When the water is directed into the grooves 45 under pressure, it flows up and down from these grooves, as indicated by arrows 51 and 52 in FIG. 4, and out from the guide arms at the top and bottom edges thereof. This flowing of water tends to wash any particles out from between the blade and the guide arm pads, and also tends to prevent particles from getting into these spaces.

FIG. 5 has been included to show the use of this invention in a band saw 54. This band saw includes a band saw blade 55 extending around upper and lower wheels 56 and 57 in the usual manner. One or more guide units 60 is or are used in this band saw, two of these units being shown in the FIG. 5. There are shown guide units 60 above and below the cutting area 61 of the saw, but there may be only one unit above or below said area. Each unit 60 consists of a pair of guide arms 64 which are the same as guide arms 20 described above, and between which blade 55 travels. The saw blade moves between the wear pads of these arms, and the arms extend across opposite faces of the saw blade throughout all or most of the width thereof. Arms 64 do not have to pivot in the same manner as arms 20, although they could do so, and they are carried by suitable supporting means, not shown. A groove 66 is formed in the inner surface of each guide arm 64 and extends across the width of saw 55. Water or other suitable cooling fluid is directed into each groove 66 in any convenient manner, such as by means of a flexible hose 67.

The guide apparatus of FIG. 5 operates in the same manner as described above. Water from grooves 66 is directed on to the opposite faces of band saw 55 to lubricate and cool this saw. The water also tends to keeps particulate material out of the spaces between the blade and the guide arms.

I claim:

1. Saw guide apparatus comprising a pair of guide arms to be positioned on opposite sides of a saw blade during operation thereof, said arms when in position having inner surfaces opposed to, parallel with and normally slightly spaced from opposite faces of the blade, said arms extending longitudinally substantially across the direction of movement of the saw blade, and means for directing a liquid under pressure through and outwardly from said surfaces substantially throughout the length thereof so as to apply films of said liquid on the faces of the blade and to flush out the spaces between the blade faces and said arm inner surfaces, thereby normally forming a liquid surface between the blade faces and the adjacent arm inner surfaces, cooling and lubricating the blade, and keeping particulate material from lodging in said spaces.

2. Saw guide apparatus as claimed in claim 1 in which said liquid-directing means are formed by openings in said arm surfaces, and means for directing liquid to and through said openings.

3. Saw guide apparatus as claimed in claim 1 in which said liquid-directing means are formed by a slot in each of said arm surfaces, and means for directing liquid to the arm slots.

4. Saw guide apparatus as claimed in claim 1 including a wear pad mounted on each guide arm and forming said surface thereof, said liquid-directing means of each arm being in the wear pad thereof.

5. Saw guide apparatus including at least one saw blade mounted for cutting operation, and a guide unit for each blade; each guide unit comprising a pair of guide arms positioned on opposite sides of the saw blade, said arms having inner surfaces opposed to, parallel with and normally slightly spaced from opposite faces of the blade, said arms extending longitudinally substantially across the direction of movement of the saw blade, and means for directing a liquid under pressure through said surfaces substantially throughout the length thereof and on to the blade therebetween to apply films of said liquid on to the faces of the blade and to flush out spaces between the blade faces and said arm inner surfaces, thereby normally forming liquid surfaces between the blade faces and the adjacent arm inner surfaces, cooling and lubricating the blade, and keeping particulate material from lodging in said spaces.

6. Saw guide apparatus as claimed in claim 5 in which said liquid-directing means for each guide unit are formed by openings in said arm surfaces, and means for directing liquid to and through said openings.

7. Saw guide apparatus as claimed in claim 5 in which said liquid-directing means for each guide unit are formed by a slot in each of said arm surfaces, and means for directing liquid to the arm slots.

8. Saw guide apparatus as claimed in claim 5 including a wear pad mounted on each guide arm and forming said surface thereof, said liquid-directing means of each arm being in the wear pad thereof.

* * * * *